United States Patent
Branson et al.

(10) Patent No.: US 9,930,081 B2
(45) Date of Patent: *Mar. 27, 2018

(54) STREAMS OPTIONAL EXECUTION PATHS DEPENDING UPON DATA RATES

(71) Applicant: International Business Machines Corporation, Armonk, NY (US)

(72) Inventors: Michael J. Branson, Rochester, MN (US); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1070 days.

This patent is subject to a terminal disclaimer.

(21) Appl. No.: 13/675,872

(22) Filed: Nov. 13, 2012

(65) Prior Publication Data

US 2014/0136723 A1 May 15, 2014

(51) Int. Cl.
*G06F 15/16* (2006.01)
*H04L 29/06* (2006.01)
*H04L 29/08* (2006.01)

(52) U.S. Cl.
CPC ...... *H04L 65/4084* (2013.01); *H04L 65/4092* (2013.01); *H04L 65/607* (2013.01); *H04L 67/322* (2013.01)

(58) Field of Classification Search
CPC ............. H04L 65/4084; H04L 65/4092; H04L 65/607; H04L 65/322
See application file for complete search history.

(56) References Cited

U.S. PATENT DOCUMENTS

| 4,612,624 A | 9/1986 | Tsuji |
| 6,243,755 B1 | 6/2001 | Takagi et al. |

(Continued)

FOREIGN PATENT DOCUMENTS

| JP | 10097437 A | 4/1998 |
| JP | 2001325041 A | 11/2001 |
| WO | 2010020577 A1 | 2/2010 |

OTHER PUBLICATIONS

Ishii et al , "Elastic Stream Computing with Clouds", Jul. 9, 2011. p. 195-202.*

(Continued)

*Primary Examiner* — Ryan Jakovac
(74) *Attorney, Agent, or Firm* — Patterson + Sheridan, LLP

(57) ABSTRACT

Processing elements in a streaming application may contain one or more optional code modules—i.e., computer-executable code that is executed only if one or more conditions are met. In one embodiment, an optional code module is executed based on evaluating data flow rate between components in the streaming application. As an example, the stream computing application may monitor the incoming data rate between processing elements and select which optional code module to execute based on this rate. For example, if the data rate is high, the stream computing application may choose an optional code module that takes less time to execute. Alternatively, a high data rate may indicate that the incoming data is important; thus, the streaming application may choose an optional code module containing a more rigorous data processing algorithm, even if this algorithm takes more time to execute.

16 Claims, 7 Drawing Sheets

(56) References Cited

U.S. PATENT DOCUMENTS

| | | |
|---|---|---|
| 6,347,254 B1 | 2/2002 | Lu |
| 6,516,409 B1 | 2/2003 | Sato |
| 7,206,861 B1 | 4/2007 | Callon |
| 7,480,640 B1 | 1/2009 | Elad et al. |
| 7,529,752 B2 | 5/2009 | Hinshaw et al. |
| 7,577,667 B2 | 8/2009 | Hinshaw et al. |
| 7,644,863 B2 | 1/2010 | Chen et al. |
| 7,834,875 B2 | 11/2010 | Liu et al. |
| 7,860,009 B2 | 12/2010 | Pike et al. |
| 7,944,863 B2 | 5/2011 | Smith et al. |
| 8,055,492 B2 | 11/2011 | Adir |
| 8,090,974 B1 | 1/2012 | Jain et al. |
| 2002/0083063 A1 | 6/2002 | Egolf |
| 2003/0229817 A1 | 12/2003 | Colasurdo et al. |
| 2004/0052212 A1 | 3/2004 | Baillargeon |
| 2006/0004935 A1 | 1/2006 | Seto et al. |
| 2006/0026269 A1 | 2/2006 | Sadovsky et al. |
| 2006/0036619 A1 | 2/2006 | Fuerst et al. |
| 2006/0064438 A1 | 3/2006 | Aggarwal |
| 2006/0206706 A1 | 9/2006 | Dietz |
| 2006/0218123 A1 | 9/2006 | Chowdhuri et al. |
| 2006/0224763 A1 | 10/2006 | Altunbasak et al. |
| 2006/0277230 A1* | 12/2006 | Nishizawa et al. ............ 707/204 |
| 2007/0073685 A1 | 3/2007 | Thibodeau et al. |
| 2007/0091089 A1 | 4/2007 | Jiao et al. |
| 2007/0091827 A1 | 4/2007 | Boers et al. |
| 2007/0129045 A1 | 6/2007 | Aerrabotu |
| 2007/0147258 A1 | 6/2007 | Mottishaw et al. |
| 2007/0240112 A1 | 10/2007 | Haselden et al. |
| 2007/0288635 A1 | 12/2007 | Gu et al. |
| 2007/0299980 A1 | 12/2007 | Amini et al. |
| 2008/0000539 A1 | 1/2008 | Bivin |
| 2008/0005392 A1 | 1/2008 | Amini et al. |
| 2008/0028095 A1 | 1/2008 | Lang et al. |
| 2008/0052041 A1 | 2/2008 | Misra et al. |
| 2008/0071939 A1 | 3/2008 | Tanaka et al. |
| 2008/0168179 A1 | 7/2008 | Gu et al. |
| 2008/0219281 A1 | 9/2008 | Akin et al. |
| 2008/0238923 A1 | 10/2008 | Liu et al. |
| 2009/0003600 A1 | 1/2009 | Chen et al. |
| 2009/0034498 A1 | 2/2009 | Banerjea et al. |
| 2009/0037553 A1 | 2/2009 | Yuan et al. |
| 2009/0178043 A1 | 7/2009 | Prasanna et al. |
| 2009/0216624 A1 | 8/2009 | Kato |
| 2009/0216694 A1 | 8/2009 | Lang et al. |
| 2009/0254774 A1 | 10/2009 | Chamdani et al. |
| 2009/0313400 A1 | 12/2009 | Amini et al. |
| 2009/0313614 A1 | 12/2009 | Andrade et al. |
| 2009/0313641 A1 | 12/2009 | Chou et al. |
| 2010/0030896 A1 | 2/2010 | Chandramouli et al. |
| 2010/0106946 A1 | 4/2010 | Imaki et al. |
| 2010/0199276 A1 | 8/2010 | Umbehocker |
| 2010/0229178 A1 | 9/2010 | Ito |
| 2010/0292980 A1 | 11/2010 | Andrade et al. |
| 2010/0293532 A1 | 11/2010 | Andrade et al. |
| 2010/0293535 A1 | 11/2010 | Andrade et al. |
| 2011/0022812 A1 | 1/2011 | van der Linden et al. |
| 2011/0191759 A1 | 8/2011 | Andrade et al. |
| 2012/0123994 A1 | 5/2012 | Lowly et al. |
| 2012/0166417 A1* | 6/2012 | Chandramouli et al. ..... 707/713 |
| 2012/0179809 A1 | 7/2012 | Barsness et al. |
| 2012/0324453 A1* | 12/2012 | Chandramouli et al. ..... 718/100 |
| 2013/0080652 A1 | 3/2013 | Cradick et al. |
| 2013/0080653 A1 | 3/2013 | Santosuosso et al. |
| 2013/0081042 A1 | 3/2013 | Branson et al. |
| 2013/0290969 A1 | 10/2013 | Branson et al. |
| 2013/0346390 A1* | 12/2013 | Jerzak et al. ................. 707/719 |
| 2014/0095676 A1* | 4/2014 | Beno ........................ G06F 8/60 709/220 |

OTHER PUBLICATIONS

Gedik et al, "SPADE: The System S Declarative Stream Processing Engine", Jun. 12, 2008, SIGMOD '08: Proceedings of the 2008 ACM SIGMOD international conference on Management of data, pp. 1123-1132.*

U.S. Appl. No. 13/190,717, entitled Using Predictive Determinism Within a Streaming Environment, filed Jul. 26, 2011.

U.S. Appl. No. 13/190,694, entitled Dynamic Reduction of Stream Backpressure, filed Jul. 26, 2011.

U.S. Appl. No. 13/682,008 entitled "Dynamic Reduction of Stream Backpressure", filed Nov. 20, 2012.

U.S. Appl. No. 13/681,919 entitled "Using Predictive Determinism Within a Streaming Environment", filed Nov. 20, 2012.

U.S. Appl. No. 13/681,820 entitled "Dynamic Runtime Choosing of Processing Communication Methods", filed Nov. 20, 2012.

U.S. Appl. No. 13/681,769 entitled "Management System for Processing Streaming Data", filed Nov. 20, 2012.

U.S. Appl. No. 13/361,287 entitled "Processing Element Management in a Streaming Data System", filed Jan. 30, 2012.

U.S. Appl. No. 13/709,405 entitled "Processing Element Management in a Streaming Data System", filed Dec. 10, 2012.

U.S. Appl. No. 13/456,600 entitled "Operator Graph Changes in Response to Dynamic Connections in Stream Computing Applications", filed Apr. 26, 2012.

U.S. Appl. No. 13/190,757 entitled "Dynamic Runtime Choosing of Processing Communication Methods", filed Jul. 26, 2011.

U.S. Appl. No. 13/190,810 entitled "Management System for Processing Streaming Data", filed Jul. 26, 2011.

U.S. Appl. No. 13/706,115 entitled "Streams Optional Execution Paths Depending Upon Data Rates", filed Dec. 5, 2012.

Nternational Search Report and Written Opinion of the ISA dated Dec. 20, 2012—International Application No. PCT/IB2012/053790.

U.S. Appl. No. 13/780,800 entitled, "Operator Graph Changes in Response to Dynamic Connections in Stream Computing Applications", filed Feb. 28, 2013.

Lipasti et al., "Exceeding the dataflow limit via value prediction.", In Proceedings of the 29th annual ACM/IEEE international symposium on Microarchitecture (MICRO 29), IEEE Computer Society, Washington, DC, USA, 226-237.

International Search Report and Written Opinion of the ISA dated May 14, 2013—International Application No. PCT/IB2013/050228.

Da Costa et al, "The Dynamic Trace Memoization Reuse Technique", Parallel Architectures and Compilation Techniques, Oct. 2000, pp. 92-99, Philadelphia, USA.

* cited by examiner

STREAMS OPTIONAL EXECUTION PATHS DEPENDING UPON DATA RATES

BACKGROUND

Embodiments of the present invention generally relate to stream applications. Specifically, the invention relates to optimizing a stream application to selectively execute portions of code based on data flow rates.

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the present disclosure include a system and a computer program product for process data. The system and computer program product include receiving streaming data to be processed by a plurality of interconnected processing elements, each processing element comprising one or more operators that process at least a portion of the received data. The system and computer program product include measuring a data flow rate in a data path between at least two operators in the plurality of processing elements. The system and computer program product also include selecting an optional code module based on the measured flow rate. The system and computer program product include executing the selected code module on one of the plurality of processing elements such that data received by the one processing element is processed by the selected code module.

DETAILED DESCRIPTION

Figure 1A:
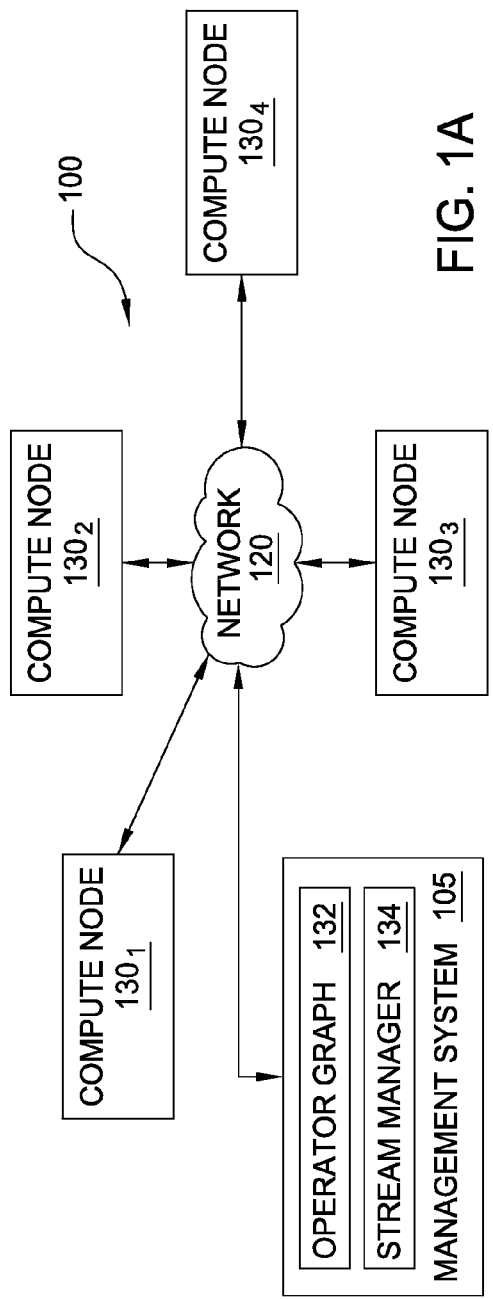
FIGS. 1A-1B illustrate a computing infrastructure configured to execute a stream computing application, according to embodiments described herein.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating executables (i.e., processing elements), as well as replicating processing elements on multiple nodes and load balancing among them. Operators in a stream computing application can be fused together to form a processing element that is executable. Doing so allows processing elements to share a common process space, resulting in much faster communication between operators than is available using inter-process communication techniques such as a TCP/IP socket. Further, processing elements can be inserted or removed dynamically from an operator graph representing the flow of data through the stream computing application.

In one embodiment, executable processing elements in a streaming application may contain one or more optional code modules. These optional code modules are computer-executable code that is executed only if one or more conditions are met. In the embodiments described herein, the optional codes modules are executed based on evaluating data flow rate between components in the streaming application. Specifically, the stream computing application may monitor the incoming data (or tuple) rate between processing elements and choose which optional code modules to use based on this rate. For example, if the data rate is high, the stream computing application may choose an optional code module that takes less time to execute. Alternatively, a high data rate may indicate that the incoming data is important; thus, the streaming application may choose an optional code module that contains a more rigorous data processing algorithm for processing the incoming data, even if this algorithm takes more time to execute than other optional code modules in the processing element.

The data rate used to select which optional code modules to execute may be either an ingress data rate (i.e., data flowing into a processing element or operator) or an egress data rate (i.e., data flowing out of a processing element or operator). In one embodiment, the data rate may be the number of tuples that flow into, or out of the processing element during a defined period of time, or the average number of tuples during a plurality of time periods. In other embodiments, the data rate may be based on the data flowing into a sub-portion of the operators within a processing element. Alternatively, the data rate may be a combination of data rates flowing into multiple processing elements. Even further, the data rate could be a ratio between the data flowing in and the data flowing out of a processing element or operator.

In one embodiment, the optional code module may be an operator in the processing element. That is, instead of dividing an operator into different code elements, where some of these elements are optional, the entire operator may be optional code that is only executing if a certain data rate is satisfied. The optional operator may be already loaded onto the processing element but be unused until the data rate is satisfied or be fused into the processing element once the data rate is satisfied.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Figure 1B:
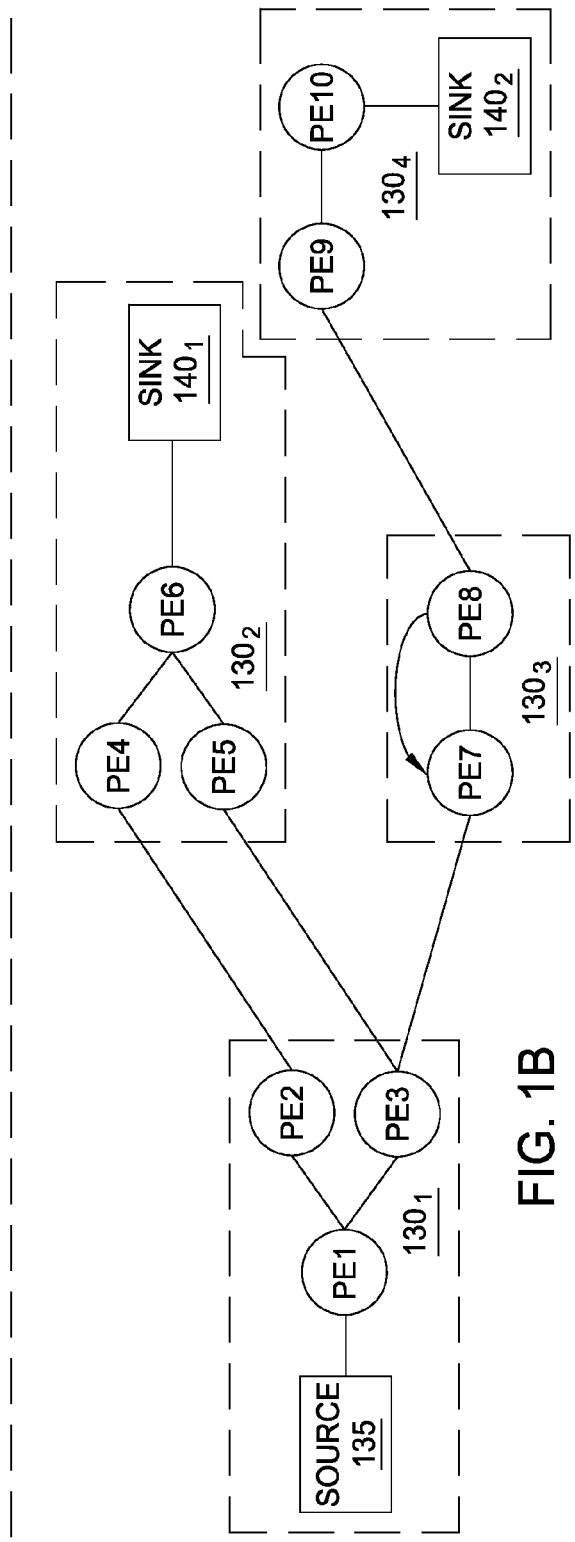

FIGS. 1A-1B illustrate a computing infrastructure configured to execute a stream computing application, according to one embodiment of the invention. As shown, the computing infrastructure 100 includes a management system 105 and a plurality of compute nodes $130_{1-4}$—i.e., hosts—which are communicatively coupled to each other using one or more communication devices 120. The communication devices 120 may be a server, network, or database and may use a particular communication protocol to transfer data between the compute nodes $130_{1-4}$. Although not shown, the compute nodes $130_{1-4}$ may have internal communication devices for transferring data between processing elements (PEs) located on the same compute node 130.

The management system 105 includes an operator graph 132 and a stream manager 134. As described in greater detail below, the operator graph 132 represents a stream application beginning from one or more source operators through to one or more sink operators. This flow from source to sink is also generally referred to herein as an execution path. Although FIG. 1B is abstracted to show connected PEs, the operator graph 132 may comprise of execution paths where data flows between operators within the same PE or different PEs. Typically, processing elements receive an N-tuple of data attributes from the stream as well as emit an N-tuple of data attributes into the stream (except for a sink operator where the stream terminates or a source operator where the stream begins).

Of course, the N-tuple received by a processing element need not be the same N-tuple sent downstream. Additionally, PEs may be configured to receive or emit tuples in other formats (e.g., the PEs or operators could exchange data marked up as XML documents). Furthermore, each operator within a PE may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the deployment of the operator graph 132. The stream manager 134 may move PEs from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements and operators (or what data tuples flow to the processing elements) running on the compute nodes $130_{1-4}$. In one embodiment, the stream manager 134 may evaluate a stream attribute (e.g., a data flow rate associated with a processing element) and select optional code elements based on whether the stream attribute meets certain criteria. One example of a stream computing application is IBM®'s InfoSphere® Streams (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. A processing element is composed of one operator or a plurality of operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element relative to transmitting data between operators in different PEs.

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Because a processing element is a collection of fused operators, it is equally correct to describe the operator graph as execution paths between specific operators, which may include execution paths to different operators within the same processing element. FIG. 1B illustrates execution paths between processing elements for the sake of clarity.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
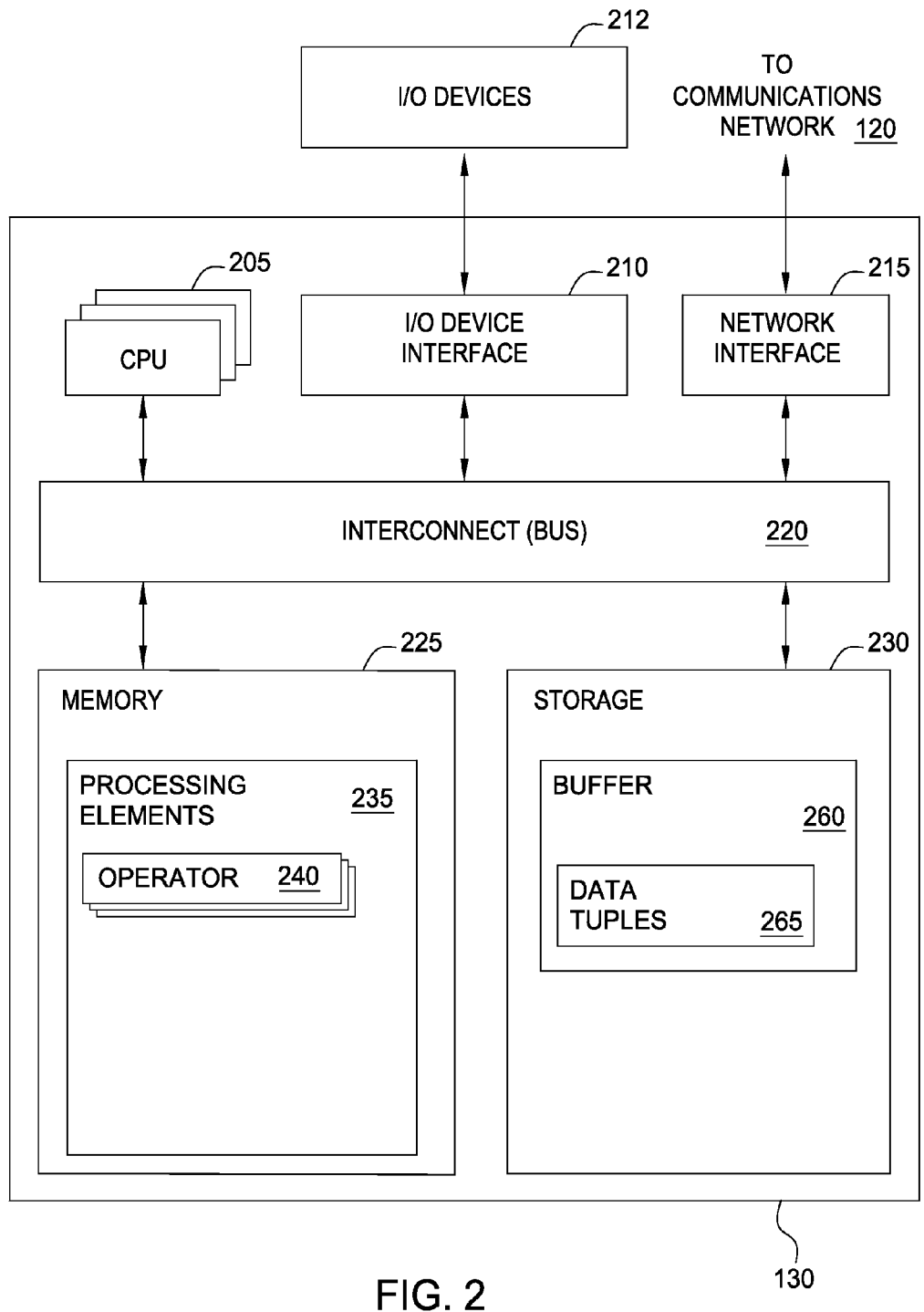
FIG. 2 is a more detailed view of the compute node of FIGS. 1A-1B, according to one embodiment described herein.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of code configured to process data flowing into a processing element (e.g., PE 235) and to emit data to other operators 240 in the same PE or to other PEs in the stream computing application. Such processing elements may be on the same compute node 130 or on other compute nodes that are accessible via communications network 120.

As shown, storage 230 contains a buffer 260. Although shown as being in storage, the buffer 260 may located in the memory 225 of the compute node 130 or a combination of both. Moreover, storage 230 may include storage space that is external to the compute node 130.

Figure 3:
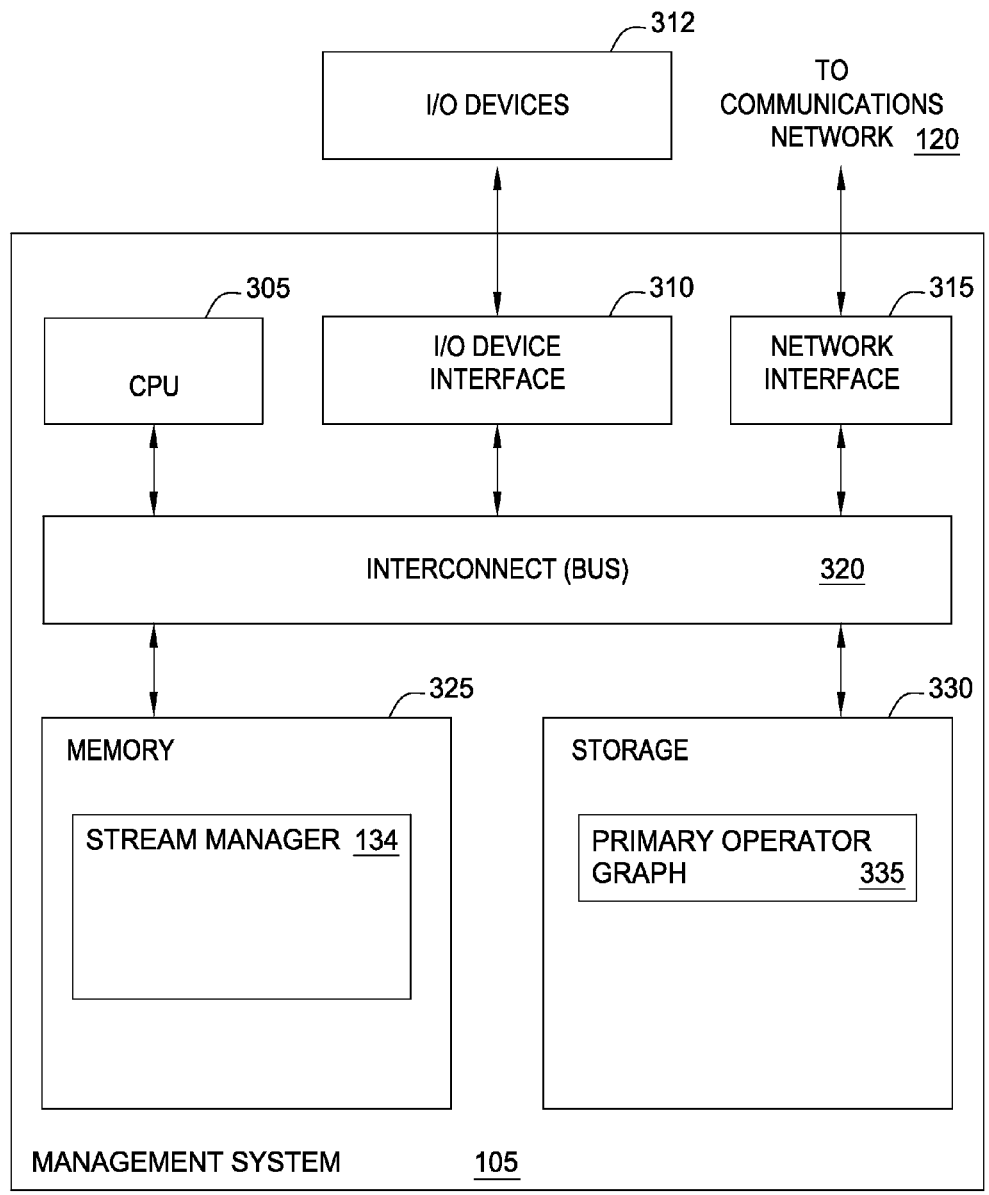
FIG. 3 is a more detailed view of the server management system of FIGS. 1A-1B, according to one embodiment described herein.

FIG. 3 is a more detailed view of the server management system 105 of FIG. 1, according to one embodiment of the invention. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132. The stream manager 134 may use the primary operator graph 132 to route tuples to PEs 235 for processing.

Figure 4:
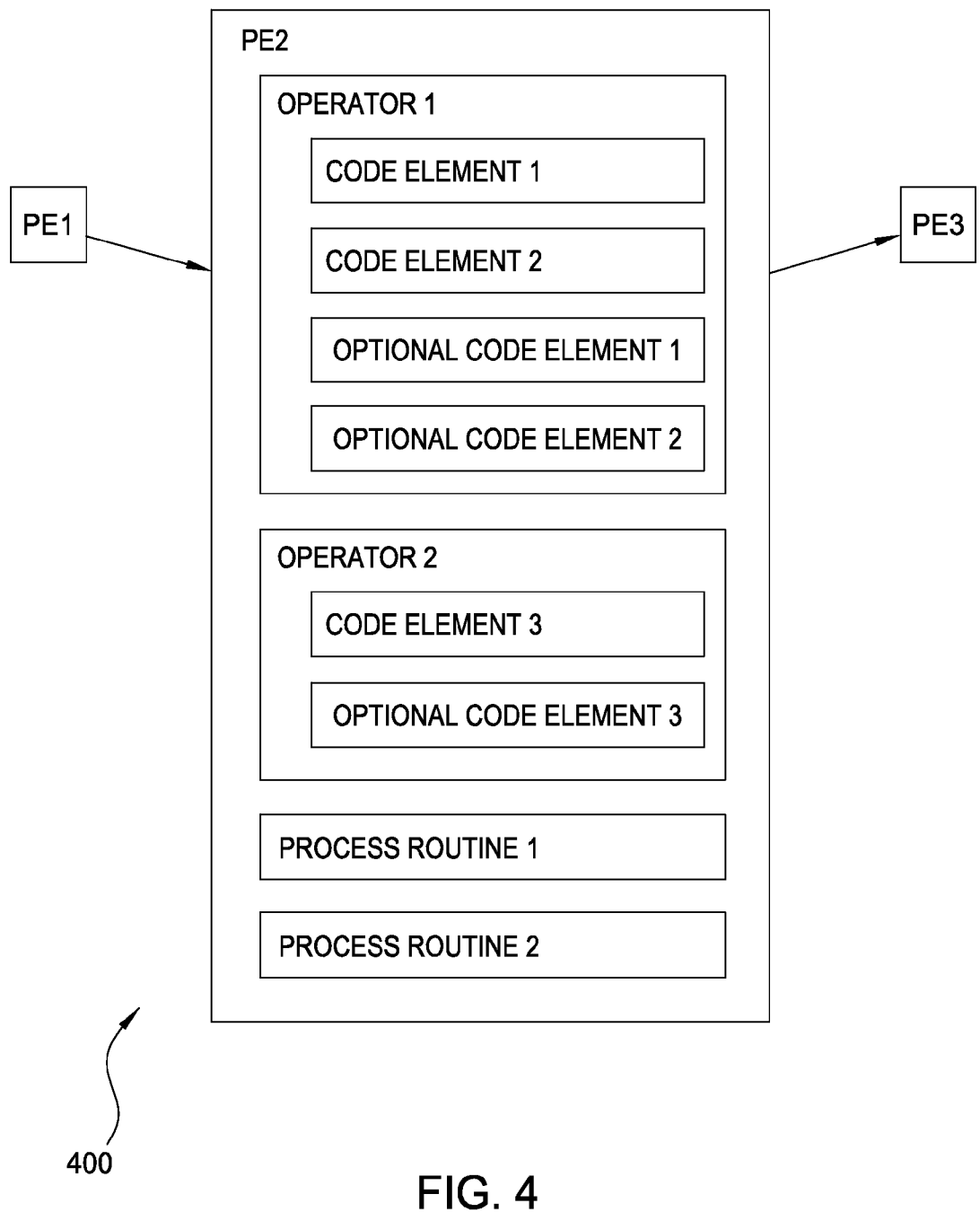
FIG. 4 illustrates is a portion of a data stream that includes a plurality of optional code elements, according to one embodiment described herein.

FIG. 4 illustrates is a portion of a data stream 400 that includes a plurality of optional code elements, according to one embodiment described herein. The stream 400 includes PEs 1, 2, and 3 where data tuples are transmitted between PEs as shown by the arrows. As shown, PE2 includes operators 1 and 2, but may include any number of operators. As described above, operators are chunks of executable code that may be fused together to form a single executable—e.g., a PE. Operators 1 and 2 include code elements 1-3 and optional code elements 1-3 that include computer instructions for processing data tuples received by PE2. In one embodiment, the code within each operator may be divided into two portions: code that is always executed if the operator is used to process incoming tuples (i.e., the code elements 1-3) and code that is only executed if a data flow rate satisfies one or more predefined thresholds (i.e., optional code elements 1-3). That is, if the processing element selects operator 1 to process a received data tuple, code elements 1 and 2 are always executed while optional code elements 1 and 2 are executed only if the data flow rate satisfies one of the thresholds.

For example, assume the received data tuples contain four different attribute-value pairs. Code element 1 may contain computer instructions for processing the first attribute-value pair while code element 2 includes instructions for processing the second attribute-value pair. Thus, each time a new tuple is received, operator 1 uses code element 1 and 2, respectively, to process the first and second attribute-value pairs. The code elements 1 and 2 may, for example, process the pairs by manipulating the value of the pairs, plugging the value into an algorithm, transmitting the value for storage, and the like. Assume further that optional code element 1 and 2 respectively contain computer instructions for processing the third and fourth attribute-value pairs. By making these code elements optional, a stream administrator (or programmer) may provide thresholds that indicate when to use these elements to process received data tuples. In one embodiment, the thresholds may be configured such that the optional code elements 1 and 2 are only executed when the processing element is not busy (e.g., the incoming tuple rate is low) or if the currently received tuples are associated with an important event that corresponds to a high incoming tuple rate. For example, the stream manager may contain logic that instructs operator 1 to use optional code element 1 to process received tuples if the incoming data rate is below 10 tuples/second (i.e., a first threshold). Moreover, the selection logic may also activate optional code element 2 if the data rate falls below 5 tuples/second (i.e., a second threshold). In this manner, the thresholds may be configured into a hierarchy, where the highest priority threshold satisfied by the data flow rate determines which optional code element or elements to use. Here, the second threshold (i.e., 5 tuples/second) has a higher priority than the first threshold, and thus, optional code element 2 is used instead of optional code element 1. Alternatively, the selection logic may be configured such that received data tuples are processed using both optional code elements 1 and 2 if the data rate rises above the thresholds. In another embodiment, the logic may use a threshold to choose between optional code elements—e.g., if the incoming tuple rate is above 10 tuples/second, operator 1 processes received tuples using optional code element 1, if not, operator 1 uses optional code element 2. In this manner, the stream administrator may configure the thresholds to select between any number of optional code elements within an operator. Although each operator 1 and 2 is shown with having both code elements and optional code elements, it is equally possible that an operator has only one of the different types of code elements.

Moreover, the system administrator may customize the thresholds for each of the operators. That is, operator 1 may use optional code element 1 when the tuple rate is above one threshold but operator 2 may use optional code element 3 when the rate is above a different threshold. As such, each operator may be configured to have any number of optional code elements with corresponding thresholds. The stream administrator may also configure processing elements and operators downstream of the operator with the optional code element to be able to process the data regardless whether the optional code elements are used.

The data flow rate may be the ingress tuple rate (i.e., the tuples transmitted from PE1 to PE2) or the egress tuple rate (i.e., the tuples transmitted from PE2 to PE3). Moreover, the optional code elements may be correlated with only one threshold or to a plurality of thresholds (e.g., execute optional code element 1 if the tuple rate is above a first threshold but below a second threshold). As illustrated in the previous examples, optional code elements may be used to process data either if the tuple rate increases or if the tuple rate decreases. In one embodiment, the thresholds may be configured such that more optional code elements are added as the tuple rate continues to increase or decrease. Alternatively, the thresholds may be configured to select only one of the optional code elements from a plurality of elements—e.g., optional code element 1 is selected if the tuple rate is between 0-10 tuples/sec, optional code element 2 is selected if the rate is between 10-20 tuples/sec, and optional code element 3 is selected if the rate is greater than 20 tuples/sec. One of ordinary skill in the art will recognize the different ways the thresholds may be configured to activate any number of optional code elements based on the data flow rate.

In one embodiment, the data flow rate is an average taken during a plurality of defined time periods. Averaging the flow rate may allow the system to settle when the data stream 400 is first initialized or to mitigate sudden spikes or dips in tuple flow rate. For example, the selection logic may count the number of tuples received each second but averages these rate over an extended time period—e.g., a minute. The logic may maintain a running average of this tuple rate or generate a new average rate each minute thereafter. In another embodiment, the flow rate is based on a ratio between the egress and ingress tuple rates of PE. For example, during certain time period, PE2 may receive 10 tuples but only transmit 2 tuples. This disparity between the ingress (input) and egress (output) tuple rates may indicate that additional processing should be performed—i.e., operators 1 and 2 should use one or more of the optional code elements 1-3 to process the tuples. As one example, the stream administrator may add a threshold that activates code elements 1 and 2 if the ingress/egress ratio exceeds 4. However, the reverse could also be true, i.e., optional code elements are used if the ingress/egress ratio falls below a predefined threshold (e.g., 0.2).

In one embodiment, the PE may use the data flow rate to select between process routines 1 and 2. As used herein, a process routine includes executable computer instructions that are not located in the operator. For each received tuple, at least one of the process routines is used to process the tuple. Moreover, in one embodiment, the process routines define which operators are used to process the received tuple. For example, process routine 1 may dictate that operator 2 is used to process the received tuple while process routine code 2 may dictate that operator 1 is used. In FIG. 4, PE2 includes at least two different process routines. Because at least one process routine is invoked for each received tuple, PE2 may use the data flow rate to select between two or more of these routines. For example, process routine 1 may be used if the incoming flow rate is above a certain threshold while process routine 2 is used if the flow rate is below that threshold. In one embodiment, only one process routine is selected per received tuple. However, in other embodiments, a processing element uses the data flow rate to select multiple process routines to process a received tuple. Nonetheless, a process routine may be used to process a received tuple either before or after an operator has processed the tuple.

In PE2, both optional code element 1-3 and process routines 1 and 2 are optional code portions that are executed based on a data flow rate. As used herein, an "optional code module" is any portion of computer-executable code whose execution depends on a specified data flow rate. The optional code module is correlated to at least one threshold such that when the threshold is satisfied by the data flow rate, the optional code module is used to process received data.

Figure 5:
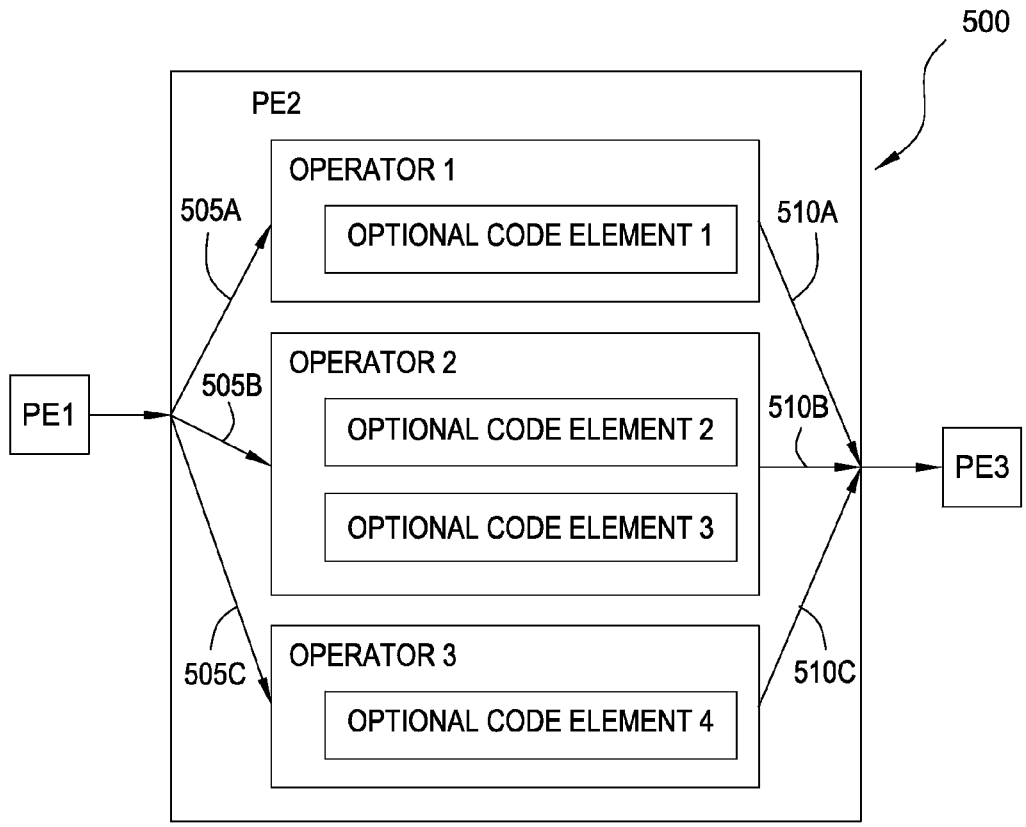
FIG. 5 illustrates a portion of a data stream where the tuple rate between operators is used to select the optional code elements, according to one embodiment described herein.

FIG. 5 illustrates a portion of a data stream 500 where the tuple rate between operators is used to select the optional code elements, according to one embodiment described herein. In data stream 500, the PE-to-PE data flow between PE1 and PE2 includes respective data paths for operators 1, 2, and 3. For example, 10 tuples may flow between PE1 and PE2 where 3 of those tuples are received and processed by operator 1, 5 tuples are received and processed by operator 2, and 2 tuples are received and processed by operator 3. Thus, the PE-to-PE data flow may be an abstraction of data flows between the individual operators in the operator graph. That is, one or more operators in PE1 (not shown) send tuples to operators 1, 2, and 3 in PE2 along the data paths 505A-C. Similarly, operators 1, 2, and 3 may transmit the processed tuples to operators in PE3 along the data paths 510A-C. Thus, instead of monitoring on a PE-to-PE flow rate (i.e., a flow rate based on the combined operator-to-operator flow rates), PE2 may use one or more of the operator-to-operator flow rates—e.g., the tuples flowing in data paths 505A-C and 510A-C—to select between the optional code elements 1-4.

Each operator may use different flow rates to determine whether or not to execute the optional code elements. For example, operator 1 may execute optional code element 1 if the tuple flow rate on path 505A is greater than 10 tuples/second while operator 2 may execute optional code element 2 and 3 if the tuple rate on path 510B is less than 5 tuples/second. Additionally, the operators 1, 2, and 3 may rely on flow rates on data paths that do not flow into or out of the operator. For example, operator 3 may invoke optional code element 4 only if the tuple flow rate on data paths 505A and 510B, which are not connected to operator 3, are both above 10 tuples/second.

Additionally, the data flow rate could be a combination of a plurality of the operator-to-operator flow rates. For example, operator 1 may process received tuples using optional code element 1 if the average tuple rate of data paths 505A and 505B is above a certain threshold. Or operators 1, 2, and 3 may use the ratio of the incoming operator flow rate to the outgoing operator flow rate to select optional code elements. In one embodiment, because there are multiple operator-to-operator flow rates, the operators may select optional code elements based on a ratio between two of the incoming flow rates or two of the outgoing flow rates instead of a ratio between incoming and outgoing flow rates. For example, operator 1 may activate optional code element 1 if the flow rate ratio between data path 505A and data path 505B is greater than a set threshold.

In one embodiment, the optional code elements may be selected based on tuple flow rates in a different data stream than the one shown in FIG. 5. For example, the flow rate between operators that are either upstream or downstream of PE2 may determine what optional code element 1-4 to execute. Moreover, although not shown, the flow rate used to select optional code modules may be a flow rate between operators in the same PE—e.g., tuples flowing along a data path from operator 1 to operator 2 within PE2.

Figure 6:
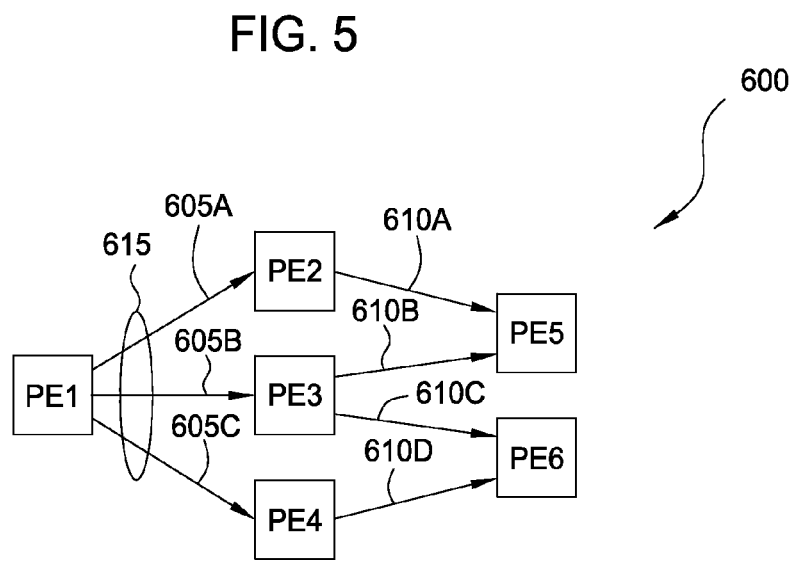
FIG. 6 illustrates a portion of a data stream where a combined tuple rate of a plurality of processing element-to-processing element data flows selects the optional code elements, according to one embodiment described herein.

FIG. 6 illustrates a portion of a data stream 600 where a combined tuple rate of a plurality of PE-to-PE data flows selects the optional code elements, according to one embodiment described herein. One or more operators in PE1 send data tuples along data paths 605A-C to PEs 1, 2, and 3 while the data paths 610A-D illustrate tuples flowing between PEs 2-4 and PEs 5 and 6. When selecting optional code elements to execute, a PE may evaluate the data flow rate on a plurality of the PE-to-PE data paths 605 and 610. For example, a PE may look at the average tuple rate along the combined data path 615 which includes each of the individual data paths 605. Or the combined data flow may be the total number of tuples flowing through the combined data path 615 over a set period of time. The PEs 1-6 may invoke an optional code module only if the combined flow rate satisfies a predefined threshold established by the stream administrator. Moreover, the flow rate may be based on only a subset of the incoming tuple rates—e.g., the tuples flowing in data path 605B and 605C. In one embodiment, the logic may select an optional code module based on a ratio between incoming tuple flow rates and outgoing tuple flow rates or between two incoming or two outgoing tuple rates.

In another embodiment, the optional code may be selected based on flow rates between processing elements that are either upstream or downstream of the PEs shown in FIG. 6. For example, optional code in PEs 2-4 may be activated so long as a tuple flow rate between PE1 and an upstream PE (not shown) remains below a set threshold. For example, monitoring an upstream flow rate may indicate that the tuple rate between PE1 and PEs 2-4 is about to increase. In response, PEs 2-4 may deactivate one or more optional code modules to free additional processing power in anticipation of the increased tuple flow from PE1.

Figure 7A:
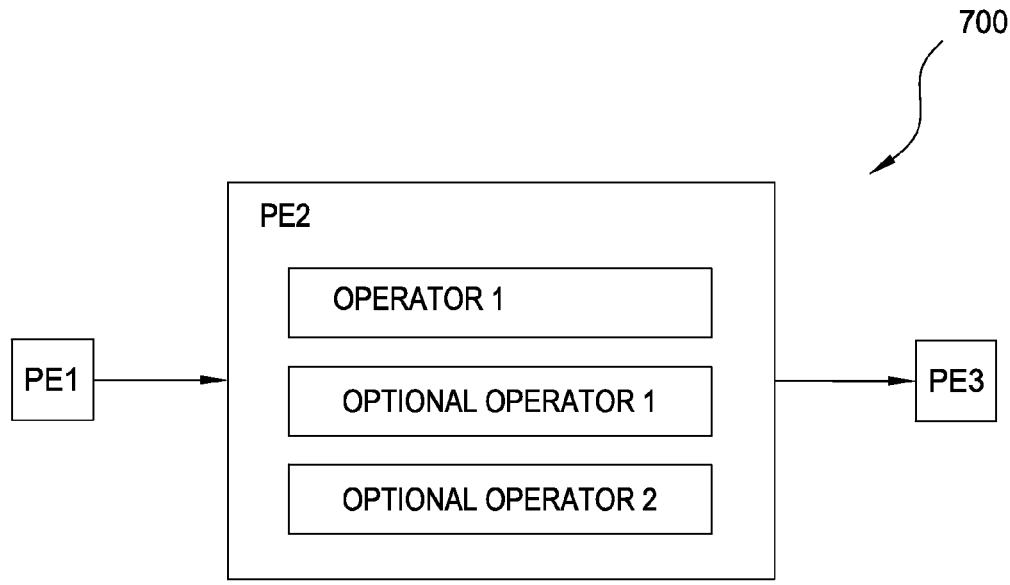
FIGS. 7A-7B illustrate a processing element in a data stream portion with optional operations, according to embodiments described herein.
Figure 7B:
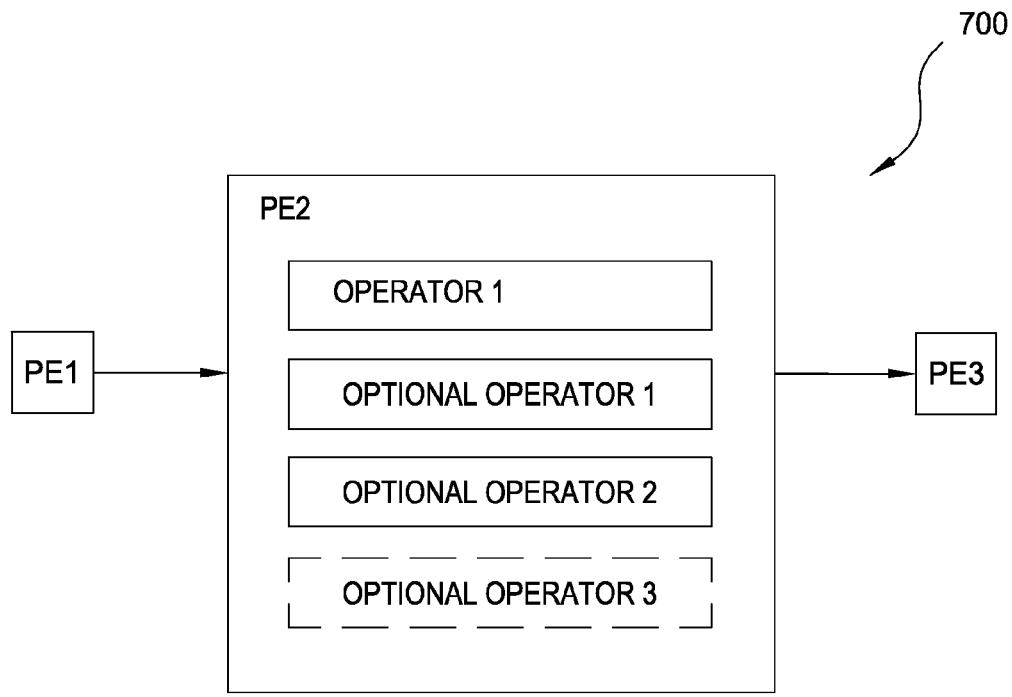

FIGS. 7A-7B illustrate a processing element in a data stream portion 700 with optional operations, according to embodiments described herein. Instead of activating optional code elements or selecting between processing routines in the PE based on a flow rate, in FIG. 7A, a flow rate is used to activate different operators in a PE. That is, an entire operator may be an optional code module. As shown, PE2 includes operator 1 and optional operators 1 and 2. Operator 1 may be used to process each tuple received on PE2 while optional operators 1 and 2 (and the code elements within) are only used if one or more flow rates satisfy respective thresholds. Thus, optional operators 1 and 2 are deployed on PE2 but remain unused until the thresholds are satisfied. Upon determining the thresholds are met, PE2 may begin transmitting tuples received from PE1 to the optional operators 1 and 2 for further processing. If the data flow no longer satisfies the threshold, the optional operators 1 and 2 may be deactivated—e.g., PE2 ceases to process received tuples using the code elements in the optional operators.

In FIG. 7B, an optional operator may be added in response to the specified data flow rate satisfying a threshold. As shown by the ghosted lines, optional operator 3 is deployed to PE2 once the threshold is met. That is, the code of optional operator 3 is fused into the executable code of PE2. Thus, as data tuples are received, PE2 uses optional operator 3 to process the tuples. In one embodiment, optional operator 3 is decoupled (i.e., un-fused) from PE2 once the data flow rate no longer satisfies the threshold. Alternatively, once optional operator 3 is fused into PE2, the stream manager may leave the element within the executable of PE even if the threshold is no longer satisfied. If the data flow rate does not satisfy the threshold, PE2 may deactivate optional operator 3 by ceasing to process received tuples using the computer instructions found in operator 3. By leaving optional operator 3 deployed, once the data rate again satisfies the threshold, the PE2 may reactivate optional operator 3 without requiring the stream manager to re-fuse the operator into PE2.

Figure 8:
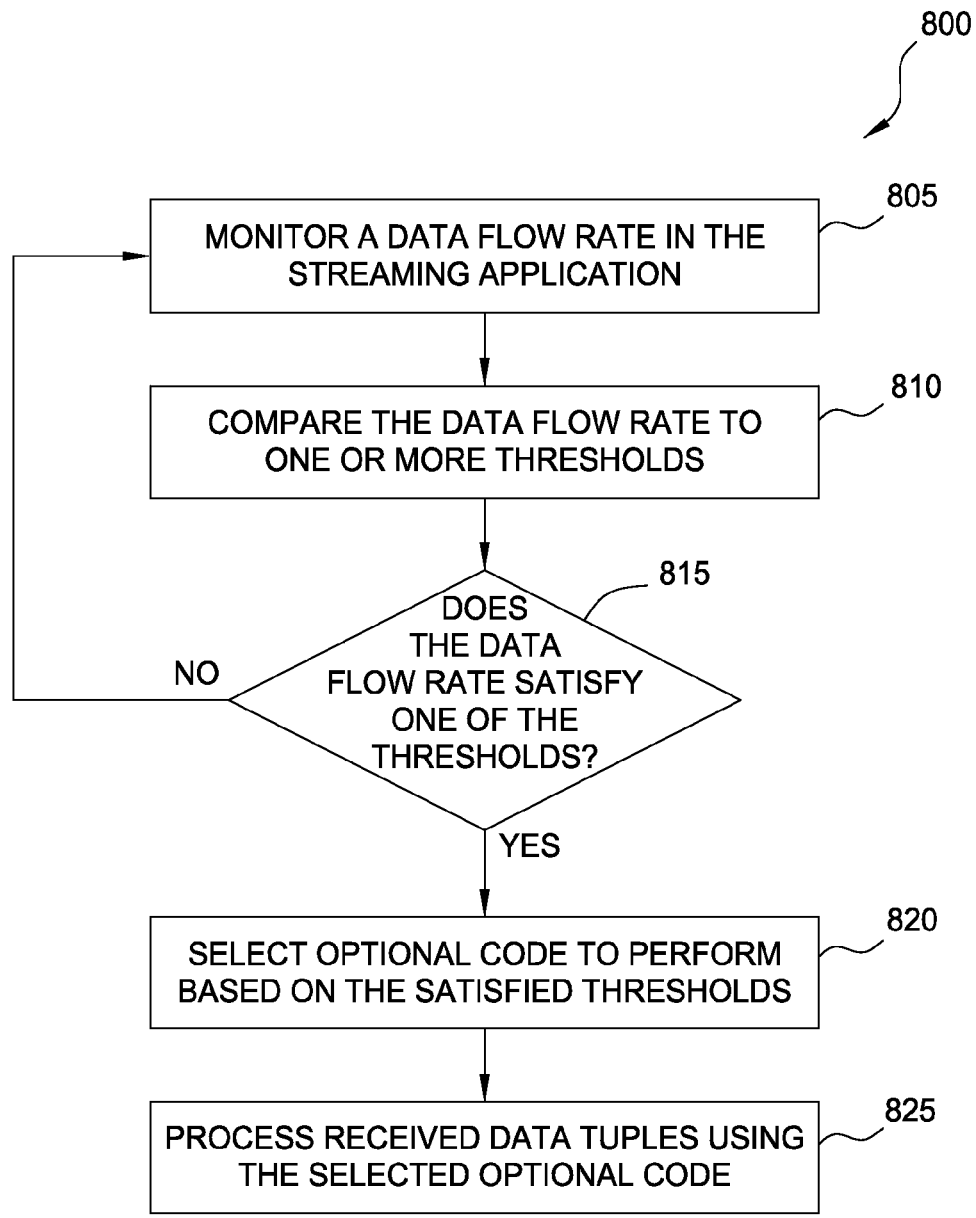
FIG. 8 is a method of selecting optional code elements to process received data tuples based on a data flow rate, according to one embodiment described herein.

FIG. 8 is a method 800 of selecting optional code modules to process received data tuples based on a data flow rate, according to one embodiment described herein. Method 800 begins at block 805 where a one or more components in a data stream contain selection logic that monitors a data flow rate in the streaming application. The present disclosure is not limited to any particular component (e.g., an operator, process routine, PE, stream manager, and the like) that may include the selection logic. For example, when choosing whether to execute optional code elements within a operator as shown in FIGS. 4 and 5, the selection logic may be contained in each operator. Alternatively, the process routine may include the selection logic and transmit instructions to each operator indicating which optional code elements to use, if any. When selecting between process routines as shown in FIG. 4, the selection logic may be implemented on the PE as a separate code element. This separate code element may, for example, constantly monitor the data flow rate so that each new tuple or group of tuples is processed using the correct process routine. When activating or fusing optional operators as shown in FIGS. 7A-B, the process routine or other control type code in the PE may contain the selection logic. Alternatively, the stream manager may monitor the data flow rate to determine when to fuse new operators—e.g., FIG. 7B—into a PE. These examples are for illustrative purposed only. One of ordinary skill will recognize other locations in a streaming application that may contain the logic necessary to monitor the specified data flow rate.

The selection logic may monitor any data flow rate in the streaming application. Thus, the data flow rate does not need to be directly associated with the PE where optional code is selected. For example, the logic may monitor a tuple flow rate that is further upstream or downstream of the PE. Or even a flow rate where the tuples are never processed by the processing element. For example, referring to FIG. 6, PE4 may monitor the tuple rate on data path 605A even though PE4 never sends data to, or receives data from PE2. The data flow rate may be ingress flow rates or egress rates (or combinations thereof). The data flow rate may be a combination of flow rates—e.g., a weighted average. Further still, the monitored flow rate may a ratio between any two or more flow rates in the operator graph. In one embodiment, the flow rate may be an operator-to-operator flow rate while in another embodiment the logic may monitor the more generalized PE-to-PE flow rates.

In block 810, the monitoring logic compares the data flow rate to one or more thresholds. For example, the tuple rate between two operators may be compared to a predefined threshold set by the stream administrator. Other thresholds may be defined for different types of flow rates—e.g., ratios or weighted averages. If at block 815 the logic determines that the measured data flow rate satisfies the predefined threshold, at block 820 the logic selects an optional code module to execute. If not, the method 800 returns to step 805 to continue to monitor the data flow rate.

If a threshold is satisfied, the logic selects the optional code module associated with the satisfied threshold. For example, the selection logic may monitor the tuple ingress rate. If the rate exceeds 10 tuples/sec, the logic may instruct a PE to use a particular process routine and activate one or more optional code elements within the PE's operators. In general, a stream administrator may configure the logic to execute any of the optional code modules (or combinations of the different modules) discussed in regards to FIGS. 4-7. In one embodiment, the flow rate may be compared to a plurality of thresholds, where each threshold is associated with a different module. For example, if the ingress flow rate to a PE falls below 10 tuples/sec, a first optional code element may be used to process received tuples. If the rate falls below 7 tuples/second, both the first optional code element and a second optional code element are used. If the rate falls below 5 tuples/second, a PE may activate the first, second, and third optional code elements, and so forth. Moreover, instead of activating only optional code elements within operators, one or more threshold may be associated with a different type of optional code module. For example, if the tuple rate is below 10/tuples second, an optional code element is activated, but if the tuple rate is below 5 tuples/second the optional code element is deactivated and a new operator is fused into the PE.

At block 825, the PE may process the received data tuples using the optional code module (e.g., an optional code element, a process routine, or an optional operator). In this manner, a streaming application may adjust to perform additional processing on received tuples based on a data flow rate within the operator graph. Although not shown in method 800, the logic may deactivate or remove the optional code module from the PE if the data flow rate no longer satisfies the threshold.

CONCLUSION

Executable processing elements in a streaming application may contain one or more optional code modules. These optional code modules are computer-executable code that is executed only if one or more conditions are met. In the embodiments described herein, the optional codes modules are executed based on evaluating data flow rate between components in the streaming application. Specifically, the stream computing application may monitor the incoming data (or tuple) rate between processing elements and choose which optional code modules to use based on this rate. For example, if the data rate is high, the stream computing application may choose an optional code module that takes less time to execute. Alternatively, a high data rate may indicate that the incoming data is important; thus, the streaming application may choose an optional code module that contains a more rigorous data processing algorithm for processing the incoming data, even if this algorithm takes more time to execute than other optional code modules in the processing element.

The data rate used to select which optional code modules to execute may be either an ingress or an egress data rate. In one embodiment, the data rate may be the number of tuples that flow into, or out of the processing element during a defined period of time, or the average number of tuples during a plurality of time periods. In other embodiments, the data rate may be based on the data flowing into a sub-portion of the operators within a processing element. Alternatively, the data rate may be a combination of data rates flowing into multiple processing elements. Even further, the data rate could be a ratio between the data flowing in and the data flowing out of a processing element or operator.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
  a computer processor; and
  a memory containing a program that, when executed on the computer processor, performs an operation for processing data, comprising:
    receiving streaming data to be processed by a plurality of interconnected processing elements, each processing element comprising one or more operators that process at least a portion of the received data by operation of one or more computer processors, wherein each one of the plurality of interconnected processing elements is hosted on a corresponding compute node;
    measuring, during a first time period, a data flow rate in a data path between at least two operators in the plurality of processing elements processing the streaming data;
    processing, during the first time period, at least a portion of the streaming data using a first code module, wherein the streaming data comprises a plurality of data tuples where each of the plurality of data tuples comprises a plurality of attribute value pairs, wherein the first code module processes a first attribute value pair of the plurality of attribute value pairs;

selecting, based on the measured data flow rate, an inactive code module stored in a first one of the plurality of processing elements processing the streaming data, wherein the selected code module is maintained in an inactive state until the data flow rate satisfies a predefined threshold; and activating, during a second time period, the selected code module on the first plurality of processing elements such that a second attribute value pair of the plurality of attribute value pairs in the streaming data received by the first processing element is processed by the selected code module, wherein the second time period occurs after the first time period, wherein the first code module processes the first attribute value pair during the second time period, and wherein the first attribute value pair is different from the second attribute value pair.

2. The system of claim 1, wherein each of the at least two operators are contained in respective processing elements such that the data path transmits the streaming data between the respective processing elements.

3. The system of claim 1, wherein the selected code module is in an operator in the first processing element, wherein the selected code module is used to process the data received by the first processing element only when the data flow rate satisfies the predefined threshold.

4. The system of claim 1, the program further comprising, upon determining that the data flow rate satisfies the predefined threshold, fusing an operator to the first processing element, wherein the fused operator is the selected code module.

5. The system of claim 4, the program further comprising, upon determining that the data flow rate no longer satisfies the predefined threshold, deactivating the fused operator from the first processing element by one of: (i) unfusing the fused operator from the first processing element and (ii) instructing the fused operator to no longer process the data received by the first processing element.

6. The system of claim 1, wherein the data flow rate is compared to a plurality of predefined thresholds arranged in a hierarchy such that the predefined threshold satisfied by the data flow rate with the highest priority is used to select the inactive code module, wherein each predefined threshold is associated with a different inactive code module.

7. The system of claim 1, wherein the data flow rate is extrapolated from data flowing on at least two data paths, wherein each of the two data paths transmit data between at least two operators in the operator graph.

8. A computer program product for processing data, the computer program product comprising:
a non-transitory computer-readable storage medium having computer-readable program code embodied therewith, the computer-readable program code comprising computer-readable program code configured to:
receive streaming data to be processed by a plurality of interconnected processing elements, each processing element comprising one or more operators that process at least a portion of the received data by operation of one or more computer processors, wherein each one of the plurality of interconnected processing elements is hosted on a corresponding compute node;
measure, during a first time period, a data flow rate in a data path between at least two operators in the plurality of processing elements processing the streaming data;

process, during the first time period, at least a portion of the streaming data using a first code module, wherein the streaming data comprises a plurality of data tuples where each of the plurality of data tuples comprises a plurality of attribute value pairs, wherein the first code module processes a first attribute value pair of the plurality of attribute value pairs select, based on the measured data flow rate, an inactive code module stored in a first one of the plurality of processing elements processing the streaming data, wherein the selected code module is maintained in an inactive state until the data flow rate satisfies a predefined threshold; and activate, during a second time period, the selected code module on the first plurality of processing elements such that a second attribute value pair of the plurality of attribute value pairs in the streaming data received by the first processing element is processed by the selected code module, wherein the second time period occurs after the first time period, wherein the first code module processes the first attribute value pair during the second time period, and wherein the first attribute value pair is different from the second attribute value pair.

9. The computer program product of claim 8, wherein each of the at least two operators are contained in respective processing elements such that the data path transmits data between the respective processing elements.

10. The computer program product of claim 8, wherein the selected code module is in an operator in the first processing element, wherein the selected code module is used to process the data received by the first processing element only when the data flow rate satisfies the predefined threshold.

11. The computer program product of claim 8, wherein the data flow rate is extrapolated from data flowing on at least two data paths, wherein each of the two data paths transmit data between at least two operators in the operator graph.

12. The computer program product of claim 8, wherein the measured data flow rate is compared to a plurality of predefined thresholds arranged in a hierarchy such that the predefined threshold satisfied by the data flow rate with the highest priority is used to select the inactive code module, wherein each predefined threshold is associated with a different inactive code module.

13. The computer program product of claim 8, the program further configured to, upon determining that the data flow rate satisfies the predefined threshold, fusing an operator to the first processing element, wherein the fused operator is the selected code module.

14. The computer program product of claim 13, the program further configured to, upon determining that the data flow rate no longer satisfies the predefined threshold, deactivating the fused operator from the first processing element by one of: (i) unfusing the fused operator from the first processing element and (ii) instructing the fused operator to no longer process the data received by the first processing element.

15. The system of claim 1, wherein the second attribute value pair of each of the data tuples is not processed by either the first one of the plurality of processing elements or the first code module during the first time period.

16. The computer program product of claim 8, wherein the second attribute value pair of each of the data tuples is not processed by either the first one of the plurality of processing elements or the first code module during the first time period.

\* \* \* \* \*